United States Patent [19]

Schandelmeier

[11] Patent Number: 4,738,338
[45] Date of Patent: Apr. 19, 1988

[54] BRAKE ANTI-SQUEAL APPARATUS

[76] Inventor: John L. Schandelmeier, 18 Dexter La., Kings Park, N.Y. 11754

[21] Appl. No.: 843,376

[22] Filed: Mar. 24, 1986

[51] Int. Cl.$^4$ .............................................. F16D 65/10
[52] U.S. Cl. ................. 188/218 R; 301/6 R; 188/38 L; 188/218 A
[58] Field of Search ............. 188/218 A, 218 R, 72.7; 301/6 R, 6 WB; 411/253; 24/25; 299/23; 238/324, 352, 353, 354; 144/193 E, 193; 403/DIG. 9; 269/48.1, 217; 74/110

[56] References Cited

U.S. PATENT DOCUMENTS

| | | | |
|---|---|---|---|
| 1,008,818 | 11/1911 | Harris | 299/23 |
| 2,087,684 | 9/1937 | Alessi-Grimaldi | 301/6 R |
| 3,186,766 | 6/1965 | Hole | 301/6 R |

FOREIGN PATENT DOCUMENTS

| | | | |
|---|---|---|---|
| 1086733 | 3/1958 | Fed. Rep. of Germany | 238/324 |
| 2132516 | 7/1984 | United Kingdom | 269/217 |

*Primary Examiner*—George E. A. Halvosa
*Assistant Examiner*—Matthew C. Graham
*Attorney, Agent, or Firm*—Bauer & Schaffer

[57] ABSTRACT

An anti-squeal system for a wheel assembly having a brake drum and a tire rim mounted in radial spaced relationship is provided with a separate wedge assembly inserted between the brake drum and the tire rim. The wedge assembly has a pair of pads separated by an inclined block which is slidably movable against the pads to force the pads radially outwardly from each other, to exert a selective pressure simultaneously on both the brake drum and tire rim.

13 Claims, 2 Drawing Sheets

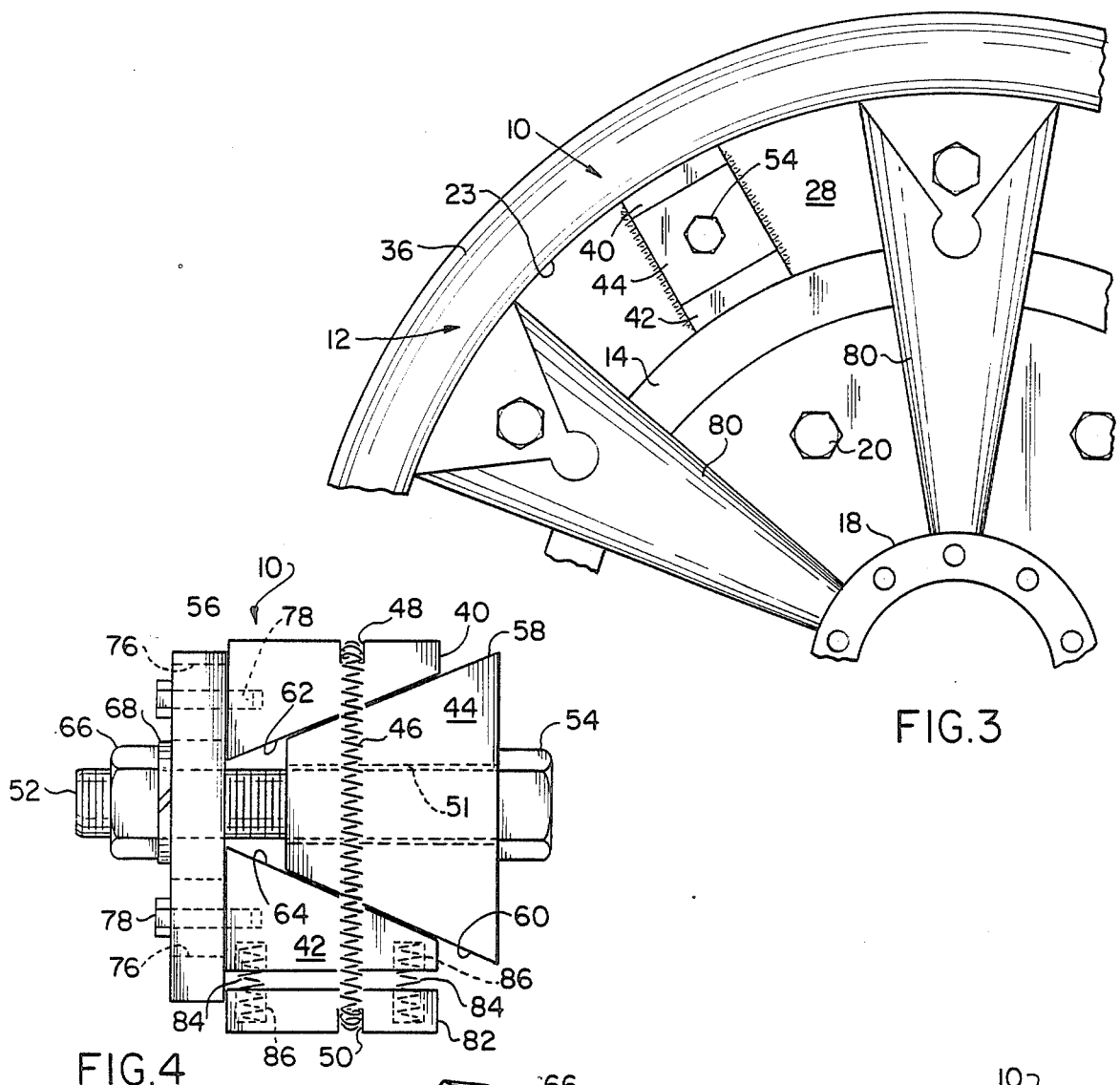
FIG.3
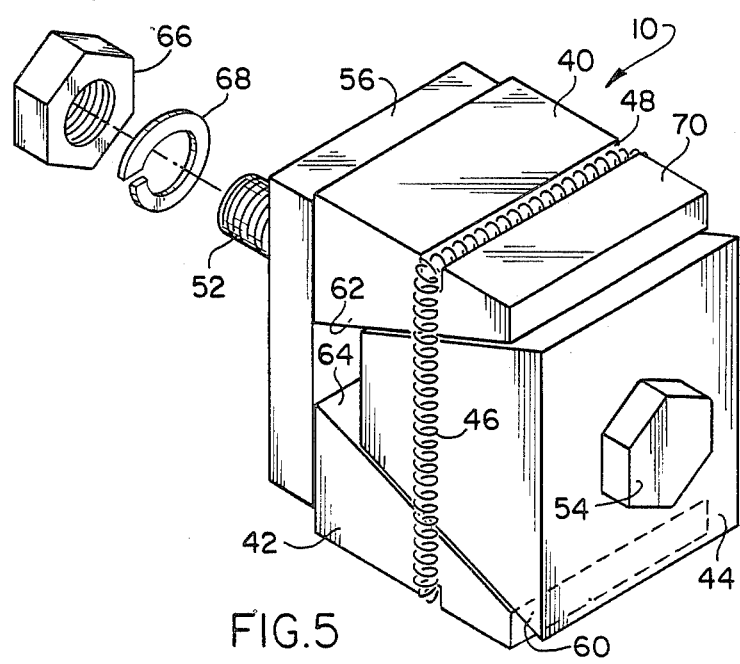
FIG.4
FIG.5

BRAKE ANTI-SQUEAL APPARATUS

BACKGROUND OF THE INVENTION

The present invention relates to brake anti-squeal systems for vehicular wheel assemblies.

It is well known that objectionable levels of noise are generated in brake assemblies, such as those utilized on trucks and other large vehicles, wherein the brake drum is substantially concentrically mounted within the plane of the wheel rim. Because the brake drum is not directly attached to the wheel rim, the drum is caused to vibrate independently of the wheel rims when the brake shoes are pressed against its interior surface, so that highly audible noises and squeals are produced.

A number of attempts at eliminating the production of such noise have been made. One such attempt is shown in U.S. Pat. No. 3,163,469 where metal spring clips are inserted between the outer surface of the brake drum and the wheel rim. The clips are intended to dampen the vibration of the drum by connecting the drum and rim. However, in this construction it is difficult to predetermine the tension necessary for the spring clip to have a meaningful connection with the rim and drum, and the degree to which noise is abated is a hit and miss process. Further, after only a short period of vehicle operation, the vibrations and stresses created during road use reduce the efficiency of the spring clip resulting in its eventual dislodgement. A still further disadvantage lies in the fact that the outer surface of the brake drum has to be provided with one or more undulations in order to hold the spring clip in place.

Another attempt was made in U.S. Pat. No. 2,369,195 where a dampening block was attached by a bolt mechanism to the frontal edge of the brake drum so as to be permanently fixed thereto. The dampening block extends radially outwardly in contact with the side flange or surface of the tire rim and is resiliently biased against this flange. This construction has the disadvantage that the dampening occurs only at the flange which is not subject to any braking pressure. Thereby, only a limited amount of dampening occurs.

A further attempt at dampening the vibration of the brake drum is shown in the patents to HOLE and HOLE et al U.S. Pat. No. 3,186,766 and U.S. Pat. No. 3,136,557, respectively. In each of these patents, a similar device is shown which comprises a set of metal plates one attached to the wheel rim and the other attached to the outer surface of the brake drum. The two plates are also attached to each other by means of a bolt and slot mechanism so that they can be relatively adjusted in the radial direction to vary the pressure applied by the plates against the rim and the brake respectively. This device is disadvantageous in that it forms a more or less permanent fixed connection between the wheel rim and the brake drum, since part of the mechanism must be welded to the brake drum.

The present invention has as its object the production of a brake anti-squeal apparatus for large vehicular wheel assemblies which avoids the disadvantages of the prior art and which provides a more simple and more effective means for eliminating noises arising from the brake drum.

It is a further object of the invention to provide a brake anti-squeal system which is usable when needed and selectively adjustable in pressure against the brake drum and tire rim in accordance with the size and other vibrating characteristics of the brake drum, and which will maintain such pressure even over extended road travel.

These objects together with other objects and advantages will be forthcoming from the following disclosure of the illustrative forms of the present invention.

BRIEF SUMMARY OF THE INVENTION

According to the present invention, a brake anti-squeal apparatus and system is provided which includes one or more wedge assemblies which are each completely separate and distinct from that of the brake drum and/or wheel rim. Each wedge assembly is inserted between the brake drum and the tire rim, either singly or in combination with several other similar assemblies spaced uniformly about the circumference of the brake drum. Each wedge assembly is separately and selectively adjustable so that it can be inserted to the desired axial depth, approximately centrally to a line that is drawn vertically through a diametric plane of the wheel and rim, but as close as possible to the open end or mouth of the brake drum, after which the degree of pressure between the rim and brake drum can be further adjusted so that a positive pressure on both the rim and the brake drum is effected thereby dampening any noise that may be produced.

The wedge assembly comprises a pair of dampening pads separated by a central adjusting block. The block has inclined surfaces and is slidable against the pads to force the pads outwardly from each other into contact with the surfaces of the wheel rim and the brake drum respectively. The central block can be manipulated so that the degree of pressure on the tire rim and brake drum can be selectively obtained. Preferably, the outer surfaces of the pads are shaped to conform to the curvature of the brake drum and tire rim respectively while their inner surfaces conform to the inclined surfaces of the block respectively. The inclined block is mounted on an elongated screw and is thereby adjusted by manipulation of the screw and held in the adjusted condition during operation of the vehicle. The screw is arranged so that it can be manipulated from the exterior of the wheel assembly, thereby allowing for adjustment of the anti-squeal device periodically and in situ without removal of the tire and/or wheel assembly.

Full details of the present invention are illustrated in the accompanying drawing and set forth in the following description of its preferred embodiments.

BRIEF DESCRIPTION OF THE DRAWINGS

In the Drawings:

FIG. 3 is an exterior side elevational view of a wheel assembly with at least one brake anti-squeal apparatus positioned therein;

FIG. 4 is a second embodiment of the brake anti-squeal apparatus; and

FIG. 5 is a view similar to FIG. 2 showing the wedge pads with substantially flat surfaces.

DESCRIPTION OF THE INVENTION

Figure 1:
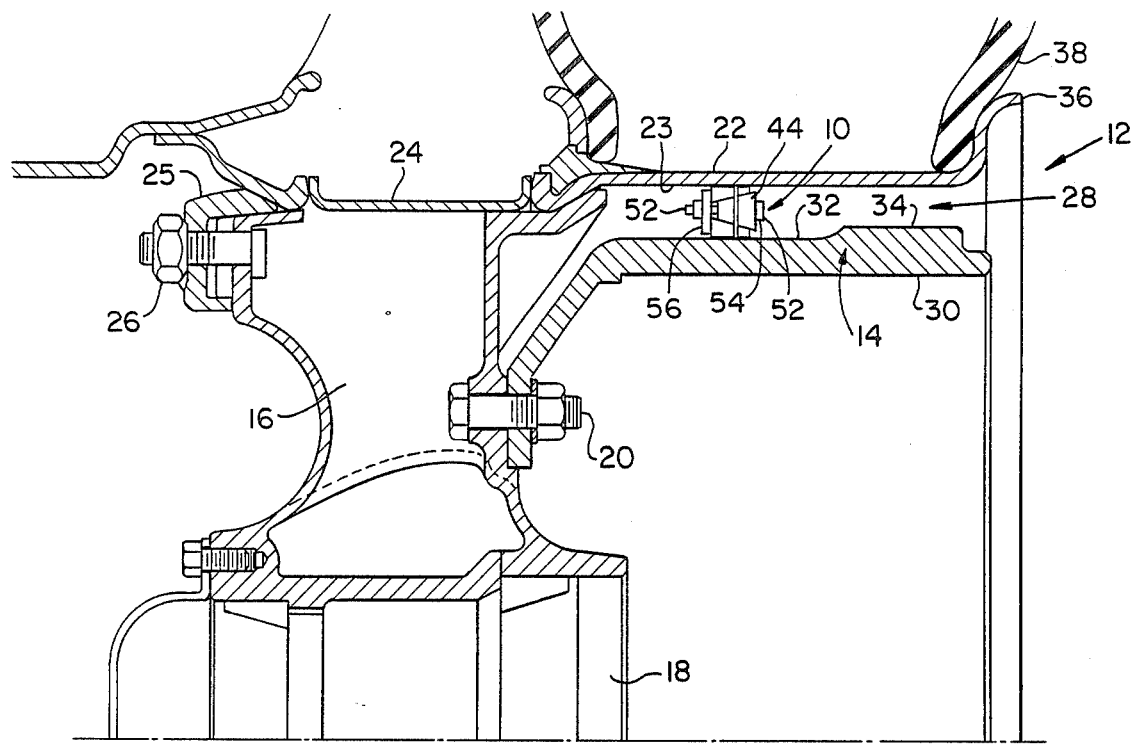
FIG. 1 is a schematic view showing in cross-section the upper half of a dual wheel assembly for a truck or other heavy duty vehicle, having installed therein the brake anti-squeal apparatus system of the present invention.

The brake anti-squeal apparatus of the present invention is illustrated in FIG. 1 as comprising at least one wedge assembly, generally depicted by the numeral 10, applied to a typical flat base dual wheel truck assembly, generally depicted by the numeral 12. However it will become apparent to those skilled in the art, that it may be equally applied to a tubeless tire wheel assembly, a single wheel assembly, or to any other wheel assembly having a generally concentric tire rim and brake drum.

The wheel assembly 12 includes a brake drum 14 suitably mounted on the yoke 16 of the wheel hub 18 by a plurality of bolts 20. A tire rim 22 is conventionally secured on the yoke 16 by a wheel spacer 24 and rim locking wedges 25 and bolts 26. The tire rim 22 extends circumferentially about and is radially spaced from the brake drum 14, leaving an annular space 28 between the brake drum 14 and tire rim 22, as is common in wheel assemblies for trucks or other large vehicles.

The brake drum 12 has a friction inner surface 30 which is suitably engageable by a plurality of brake shoes (not shown) in order to apply a braking force to the entire wheel assembly. The brake drum 14 has an outer surface 32 which is generally smooth but which may conventionally be provided with an outwardly extending crown 34 which extends into the space 28. The tire rim 22 is provided with an inner surface 23 which is generally flat and which terminates, as seen in cross section, with suitable flange structures 36 for seating or holding a tire 38 in place. The foregoing represents a conventional construction of a truck dual wheel assembly. Various details have been, of course, omitted for the sake of brevity. However, those skilled in the art will be readily familiar with them, and because they do not form any part of the invention, those details are not deemed necessary or desirable since they would obscure the features of the present invention.

Figure 2:
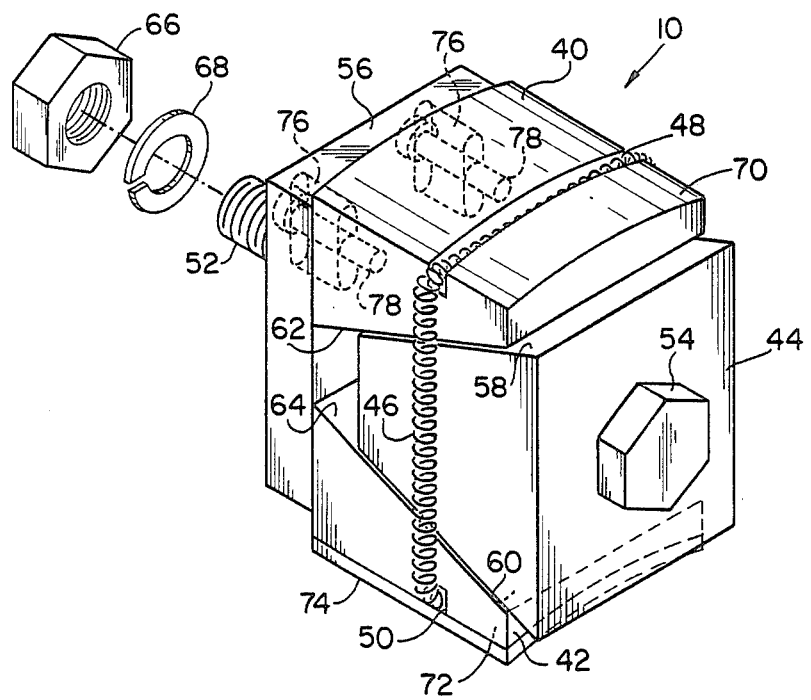
FIG. 2 is a an enlarged view of the wedge assembly of the anti-squeal apparatus employed in the system shown in FIG. 1.

Preferably, a plurality of wedge assemblies 10, are inserted uniformly spaced about the circumference of the brake drum 14 within the annular space 28. As seen in detail in FIG. 2, each wedge assembly 10 comprises a rim engaging pad 40, a brake drum engaging pad 42, and a central adjusting block 44 held in engagement by a single girdling or encircling coil spring 46 that also may be in the form of a rubber "O" ring similar to that of a rubber band set within transverse grooves 48 and 50 formed in the exterior faces of the rim engaging pad 40 and the brake drum engaging pad 42, respectively.

The central adjusting block 44 has a thread at 51 (FIG. 4) for threaded movement axially along a rotatable elongated machine bolt 52 adjacent its head 54. The bolt 52 passes and is freely movable through a support or base plate 56, against which the rear surfaces of the rim engaging pad 40 and the brake drum engaging pad 42 respectively abut and seat. The central adjusting block 44 is trapezoidally shaped so as to have inwardly inclined surfaces 58 and 60 slidably engaging conformingly inclined surfaces 62 and 64 on the rim engaging pad 40 and brake engaging pad 42 respectively. By threading the bolt 52 along the length of the wedge adjusting block 44, it is possible to quickly and easily dislodge the block 44 from between the pads 40 and 42 by tapping it with any object against the exposed bud of the bolt 52. This causes the wedge 44 to move outward from and from engagement with the pads 40 and 42 to enable the assembly 10 to be removed from the space 28.

In this manner, the bias of the coil spring 46 and the action of the head 54 of the threaded bolt 52 on and against the central block 44 causes the rim engaging pad 40 and brake drum engaging pad 42 to be also biased against the back plate 56. Manipulation of the nut 66 of the bolt 52 causes the central adjusting block 44 to move toward or away from the base plate 56, thus adjusting the radial spacing or distance between the rim engaging pad 40 and the brake drum engaging pad 42. A locking nut 66 and, if desired, a washer 68 are provided over the free end of the elongated bolt 52 so as to maintain the central adjusting block 44 in fixed position once adjustment is set.

The outer engaging surface 70 of the rim engaging pad 40 may be convexedly shaped, as shown, to conform to the inner engaging surface of the tire rim 22 while the outer surface 72 of the brake drum engaging pad 42 may be concavedly formed, to conform to the outer surface 32 of the brake drum 14. However, it has been found that the annular space 28 is of such small radial extent and the brake drum 14 and the rim 22 are of such small diameter that, in practice, the surfaces 70 and 72 may be substantially flat, as shown in FIG. 5 and will still provide sufficient engaging contact therewith to perform in accordance with the teaching of the invention. It has been found to be advantageous to line either one or both of the concave/convex surfaces 70 and 72 of the brake drum engaging pad 42 with a layer 74 of a material which insures equalization of the contact pressure between the pad 42 and the drum 14. Such pad may be of plastic, rubber or combinations thereof.

Although not essential, the rim engaging pad 40 and the brake drum engaging pad 42 may be more positively held in guided slidable engagement with the base plate 56. This may be done by providing the base plate 56 with one or more vertical slots 76 through which a bolt 78 passes into and is fixed within the rear surfaces of the rim enaging pad 40 and the brake engaging pad 42.

Preferably the wedge assembly 10 may be located approximately forward of the axial center of the wheel assembly and as close as possible to the open end or mouth of the brake drum diametric plane containing the central axis of the wheel. It has been found that any desired number of the wedge assemblies 10 may be inserted within the circumferential space 28 for generally good performance, although it is preferred that at least three such assemblies 10 be used, so that uniform spacing and equalization of the forces within the annular space 24 is obtained.

As seen in FIG. 3, the wedge assembly 10 may be visible and accessible from the exterior frontal face of the wheel assembly between an adjacent pair of wheel spokes 80. At times, the assembly also may be inserted from the rear of the annular space 28 when the construction of the wheel assembly 12 so permits. In practice, the wedge assembly 10 may be manually inserted between the brake drum 14 and the wheel rim 22 simply and easily without tools and without requiring demounting of any part of the wheel. Once inserted in the space 28, only a simple elongated wrench is required to make the necessary selective radial adjustment of the screw 52 until the rim engaging pad 40 and the brake engaging pad 42 engage with a desired contact pressure against the rim 22 and brake drum 14.

Contact pressure is easily adjusted by further manipulation of the central block 44 should the central block 44 accidentally loosen. Should the need ever occur for changing brake linings, or for trueing the brake drums after extended use of the vehicle, the wedge assembly 10 may be simply removed and reinstalled. Since the wedge assembly is neither attached to nor physically connected to either the brake drum 14 or to the tire rim 22, removal and/or replacement does not effect the tire rim or brake drum in any manner.

In the recognition that expansion and contraction of the brake drum 14 occurs upon repeated and successive braking, it is contemplated that either one of the two outer engaging pads 40 and 42 may be made of natural or synthetic rubber, plastic or any similar material, which will readily act as a dampener of vibration and which will conform to the expansion and contraction of the brake drum. The central inclined block 44 may be made of any of the same materials as either or both pads, although it may be preferred to employ plastic or aluminum for its smooth surface characteristics, and because resiliency is not essential for the block.

In FIG. 4, a second embodiment of the present invention is shown wherein the same elements bear the same reference numerals. Here, however, means for compensating for greater than normal expansion and contraction is provided. In this embodiment, the brake drum engaging pad 42 is provided with a separate shoe member 82 as its outer contact member. The shoe member 82 is connected to the body of the brake drum engaging pad 42 by a plurality of compression springs 84 set within holes 86 formed in both the pad 42 and the shoe member 82. The girdling coil spring 46 holds the shoe member 82 normally in place along with the body of the pad 42. The resilient radially outward bias on the separable shoe member 82 created by springs 84 places the shoe member 82 resiliently against the brake drum 14 and allows for gross compensation of variations in the surface of the brake drum 14 or in the actual diameter of the brake drum during use.

It will be appreciated that the brake anti-squeal apparatus 10 thus provided is simple and inexpensive, both to manufacture and to install and may be set in place and position as part of a wheel system without the need for any special tools at all. It is highly effective in preventing brake squeal or other wheel noise.

Various modifications changes and embodiments have been shown and described. Other such modifications and changes will be obvious to those skilled in the present art. Accordingly, it is intended that the present disclosure be taken as illustrative of the invention and not as limiting of its scope.

What is claimed is:

1. Apparatus for preventing brake noise in wheel assemblies having a brake drum and a tire rim mounted in spaced relationship about said brake drum, said apparatus being insertable between said brake drum and tire rim and comprising a support separate from said brake drum and tire rim, a brake drum engaging member and a tire rim engaging member radially spaced from each other and each in slidable abutment with said support and a movable wedge memebr located between said brake drum and tire rim engaging members, said brake drum engaging and tire rim engaging members having exterior surfaces for respectively engaging said brake drum and the tire rim and radial interior surfaces for engaging said wedge, an axially movable bolt threadedly engaging said wedge and extending freely through said support to move said wedge between said brake drum and tire engaging members, said wedge being shaped to urge said brake drum and tire engaging members against said support and in a direction radially outward from each other into contact with said brake drum and tire rim respectively, said brake drum engaging member comprising a body portion engaging said wedge member, a shim portion engaging said brake drum, and means for resiliently connecting said portions and biasing said shim member against said brake drum.

2. The apparatus according to claim 1 wherein said engaging members are held about said wedge member by means biasing said engaging members and said wedge member into engagement with each other.

3. The apparatus according to claim 1 wherein said engaging members have outer surfaces conforming in shape to that of the surfaces of brake drum and tire rim respectively and inner surfaces conforming in shape to that of the respective inclined surfaces of said wedge member.

4. The apparatus according to claim 1 wherein said wedge member is mounted on an elongated screw extending axially therethrough and threadedly engaged therewith, said wedge member being axially movable along said screw in response to the rotation of said screw.

5. The apparatus according to claim 1 wherein said engaging members are formed of material expanding and contracting in conformity to the expansion and contraction of said brake drum.

6. The apparatus according to claim 1 wherein at least the outer surface of said brake drum engaging member is provided with a layer of material acting as a heat sink.

7. The apparatus according to claim 1 wherein said resiliently connecting means comprises at least one compression spring secured at its respective ends in said body portion and said rim portion.

8. A brake anti-squeal system for a vehicle or the like comprising a wheel assembly having a brake drum and a tire rim substantially concentrically mounted in radial spaced relationship and a separate wedge assembly inserted between said brake drum and said tire rim said wedge assembly comprises a pair of pads separated by an inclined block, said pads being held about said block by an elongated continuous spring circling said pads and blocks, said inclined block being slidable against said pads to force said pads radially outwardly from each other into selected variable pressure contract with said brake drum and tire rim, and adjustment means adjustable on said assembly and threaded in said inclined block to slide said block between said pads, said wedge assembly being radially adjustable in contact with said brake drum and said rim to exert a selected variable pressure on both said brake drum and tire rim simultaneously.

9. The system according to claim 8 wherein said pads have outer surfaces conforming in shape to that of the surfaces of brake drum and tire rim respectively and having inner surfaces conforming in shape to respective inclined surfaces of said block.

10. The system according to claim 9 including a support plate against which said pads seat, said inclined block being threadedly mounted on said adjustment means that passes freely through said support plate, said block being axially movable along and with said screw in response to the rotation of said screw.

11. The system according to claim 9 including a separate shoe member interposed between said brake drum engaging pad and said brake drum, and means for resiliently connecting said shoe member to said brake drum engaging pad and biasing said shoe member against said brake pad.

12. The system according to claim 8 wherein said pads are formed of material expanding and contracting in conformity to the expansion and contraction of said brake drum.

13. The system according to claim 8 wherein at least the outer surface of said pad contacting said brake drum is provided with a layer of material acting as a heat sink.

* * * * *